(12) United States Patent
Guo et al.

(10) Patent No.: US 11,988,430 B2
(45) Date of Patent: May 21, 2024

(54) AIR CONDITIONING UNIT FOR AN ACCURATE CONTROL OF SUPPLY AIR TEMPERATURE, AND OPERATION CONTROL METHOD AND OPERATION CONTROL DEVICE FOR AIR CONDITIONING UNIT

(71) Applicant: Vertiv Tech Co., Ltd., Guangdong (CN)

(72) Inventors: Jie Guo, Guangdong (CN); Sheng He, Guangdong (CN); Chang Liu, Guangdong (CN); Xiuling Li, Guangdong (CN)

(73) Assignee: Vertiv Tech Co., Ltd., Guandong (CN)

( * ) Notice: Subject to any disclaimer, the term of this patent is extended or adjusted under 35 U.S.C. 154(b) by 0 days.

(21) Appl. No.: 17/993,960

(22) Filed: Nov. 24, 2022

(65) Prior Publication Data

US 2023/0168016 A1 Jun. 1, 2023

(30) Foreign Application Priority Data

Nov. 26, 2021 (CN) .......................... 202111417158.5

(51) Int. Cl.
*F25B 49/02* (2006.01)
*F25B 9/00* (2006.01)
*F25B 9/10* (2006.01)

(52) U.S. Cl.
CPC ............ *F25B 49/022* (2013.01); *F25B 9/002* (2013.01); *F25B 9/10* (2013.01); *F25B 2400/061* (2013.01);
(Continued)

(58) Field of Classification Search
CPC .... F25B 9/00; F25B 9/002; F25B 9/10; F25B 25/005; F25B 41/00; F25B 41/20;
(Continued)

(56) References Cited

U.S. PATENT DOCUMENTS

2013/0098085 A1 4/2013 Judge et al.
2016/0363359 A1 12/2016 Lin et al.

FOREIGN PATENT DOCUMENTS

CN 102135300 A 7/2011
CN 103256687 A 8/2013
(Continued)

OTHER PUBLICATIONS

CN 108050719 (English translation) (Year: 2018).*
(Continued)

*Primary Examiner* — Jonathan Bradford
(74) *Attorney, Agent, or Firm* — Harness, Dickey & Pierce, P.L.C.

(57) ABSTRACT

An air conditioning unit includes: a first refrigeration system including a first evaporator, a first compressor, a first condenser, a first one-way valve, and a first throttling element connected in sequence in a loop as well as a second one-way valve connected in parallel with the first compressor, and a first fluorine pump connected in parallel with the first one-way valve; and a second refrigeration system including a second evaporator, a second compressor, a second condenser, a third one-way valve, and a second throttling element connected in sequence in a loop as well as a fourth one-way valve connected in parallel with the second compressor, and a second fluorine pump connected in parallel with the third one-way valve, where the first evaporator and the second evaporator are arranged front and rear in sequence along a return air cooling duct.

13 Claims, 3 Drawing Sheets

(52) U.S. Cl.
CPC ... *F25B 2600/0253* (2013.01); *F25B 2600/13* (2013.01); *F25B 2700/2104* (2013.01); *F25B 2700/2106* (2013.01)

(58) Field of Classification Search
CPC .......... F25B 41/22; F25B 41/42; F25B 49/02; F25B 49/022; F25B 2400/06; F25B 2400/061; F25B 2500/05; F25B 2500/18; F25B 2500/19; F25B 2600/02; F25B 2600/0253; F25B 2600/13; F25B 2700/2104; F25B 2700/2106
See application file for complete search history.

(56) References Cited

FOREIGN PATENT DOCUMENTS

| | | | |
|---|---|---|---|
| CN | 107850355 | A | 3/2018 |
| CN | 209655448 | U | 11/2019 |
| CN | 111720901 | A | 9/2020 |
| CN | 213778222 | U | 7/2021 |
| CN | 213873262 | U | 8/2021 |
| EP | 2917649 | A1 | 9/2015 |
| EP | 2917649 | B1 | 9/2017 |
| JP | 2007101093 | A | 4/2007 |
| JP | 2016205773 | A | 12/2016 |
| JP | 2021173420 | A | 11/2021 |
| WO | 2012145263 | A2 | 10/2012 |
| WO | 2013175890 | A1 | 11/2013 |
| WO | 2016201172 | A1 | 12/2016 |

OTHER PUBLICATIONS

Extended Search Report dated Apr. 21, 2023, in corresponding European Application No. 22209236.3.
International Search Report and Written Opinion dated Aug. 25, 2022, in corresponding International Application No. PCT/CN2022/072867 (including English translation).
Japanese Office Action regarding Application No. 2022-187040, dated Oct. 11, 2023.

* cited by examiner

AIR CONDITIONING UNIT FOR AN ACCURATE CONTROL OF SUPPLY AIR TEMPERATURE, AND OPERATION CONTROL METHOD AND OPERATION CONTROL DEVICE FOR AIR CONDITIONING UNIT

The present disclosure claims the priority to Chinese Patent Application No. 202111417158.5, titled "AIR CONDITIONING UNIT, AND OPERATION CONTROL METHOD AND OPERATION CONTROL DEVICE FOR AIR CONDITIONING UNIT", filed on Nov. 26, 2021 with the China National Intellectual Property Administration, which is incorporated herein by reference in its entirety.

FIELD

The present disclosure relates to the technical field of air conditioners, and in particular to an air conditioning unit, and an operation control method and an operation control device for an air conditioning unit.

BACKGROUND

With the continuous development of a machine room of a data center, the volume of various equipment in the machine room is decreasing, and the amount of information transmitted, stored and calculated is increasing. Therefore, the heat density of the data center is also gradually increasing. In response to the national call for energy conservation and emission reduction and the requirements of relevant standards, an indoor design temperature of an existing reconstructed or newly built machine room is gradually increased. Under a same heat load, when the indoor design temperature is increased, a refrigeration capacity of a single compressor can be increased, the investment of refrigeration equipment can be reduced, and at the same time an evaporating temperature of a unit can also be increased, so that the compressor can operate more efficiently, thus improving the energy efficiency of a system in many aspects.

The increase in indoor design temperature also provides an opportunity for the utilization of natural cooling in the machine room. A driving force for the utilization of natural cooling comes from a difference between indoor and outdoor temperatures or a heat exchange between an indoor temperature and an outdoor air after evaporating and cooling, so as to utilize the natural cooling. When the indoor temperature is higher, a higher difference between indoor and outdoor temperatures may be more easily established, so that the natural cooling may be more easily utilized.

A traditional heat pipe type air conditioner may effectively utilize the natural cooling. For example, a gravity heat pipe may produce a refrigeration effect under the difference between indoor and outdoor temperatures without additional power cycle, but the power is unstable. More commonly, a refrigerant pump is used to push a pump cycle. In a case that a natural cooling capacity is not enough, a mechanical refrigeration of the compressor should be added for supplement, and through a system pipeline design, the two may be combined together. As shown in FIG. 1, an evaporator 01, a compressor 02, a condenser 03, a fluorine pump 04, an expansion valve 05, a one-way valve 06, and a one-way valve 07 are included. That is, a refrigeration system includes both a compressor and a fluorine pump. In a case that a natural cold source may be used, a pump mode is adopted. In a case that the refrigeration capacity does not satisfy a heat load demand, a compressor mode is adopted.

However, the current refrigeration system has many disadvantages. That is, only the pump mode or the compressor mode may be operated, and there is no energy conservation effect when the pump mode and the compressor mode are operated at the same time. There is also a product designed as a dual refrigeration system. That is, an air conditioning unit includes two of the above refrigeration systems, but the two refrigeration systems are independent of each other and are simply assembled side by side, with each system providing half of the air volume of the air conditioning unit. Since a heat exchange capacity of the evaporator in each refrigeration system is not improved, the utilization of natural cold source is also limited accordingly.

Moreover, control of supply air temperature of the air conditioning unit is currently a mainstream energy conservation control mode in the industry. For an application of a closed cold passage or a hot passage, the control of supply air temperature may adapt to the needs of equipment, and also provide a prerequisite for an application of high return air. However, in the above unit with two systems, air paths of the two refrigeration systems are relatively independent. Therefore, supply air temperatures may not be effectively and fully mixed. Especially in a case that the system operates under low load, a difference between supply air temperatures of the two refrigeration systems is quite large, making them more difficult to fully mix, causing a local hot spot in equipment that is required to be dissipated, thus reducing the reliability.

SUMMARY

According to the present disclosure, an air conditioning unit, and an operation control method and an operation control device for an air conditioning unit are provided. With the air conditioning unit, the energy consumption of a system can be reduced, the energy efficiency of the system can be improved, and a very uniform supply air temperature can be ensured, which is beneficial to more accurate control of the supply air temperature.

To achieve the above objects, the following technical solutions are provided according to the present disclosure.

An air conditioning unit includes a first refrigeration system, a second refrigeration system, and a controller.

The first refrigeration system includes a first evaporator, a first compressor, a first condenser, a first one-way valve, and a first throttling element connected in sequence in a loop as well as a second one-way valve connected in parallel with the first compressor, and a first fluorine pump connected in parallel with the first one-way valve.

The second refrigeration system includes a second evaporator, a second compressor, a second condenser, a third one-way valve, and a second throttling element connected in sequence in a loop as well as a fourth one-way valve connected in parallel with the second compressor, and a second fluorine pump connected in parallel with the third one-way valve, where the first evaporator and the second evaporator are arranged front and rear in sequence along a return air cooling duct.

The controller is connected to the first compressor, the first fluorine pump, the second compressor and the second fluorine pump in signal, and configured to:

acquire a load percentage of the air conditioning unit and a difference between indoor and outdoor temperatures; and control a working state of the first compressor, the first fluorine pump, the second compressor and the second fluorine pump based on the load percentage and the difference between indoor and outdoor temperatures.

The air conditioning unit according to the embodiment of the present disclosure includes the first refrigeration system, the second refrigeration system, and the controller. The first refrigeration system and the second refrigeration system are independent of each other in a pipeline connection. Each refrigeration system is a complete refrigeration system integrated with the compressor and the fluorine pump. Since the first evaporator in the first refrigeration system and the second evaporator in the second refrigeration system are arranged front and rear in sequence along the return air cooling duct, when the air conditioning unit operates, in the return air cooling duct, an indoor return air may first pass through the first evaporator for pre-cooling, and then pass through the second evaporator for re-cooling or supplementary cooling, so as to achieve a supply air temperature required by a machine room where the air conditioning unit is located, or a cooling capacity required by the machine room. In the air conditioning unit, a return air volume passing through the first evaporator and a return air volume passing through the second evaporator are the same. A return air temperature of the first refrigeration system is equivalent to a return air temperature of the machine room, and a return air temperature of the second refrigeration system is equivalent to an outlet air temperature of the first refrigeration system. Compared with the air conditioning unit with completely independent dual refrigeration system, both the first refrigeration system and the second refrigeration system have a larger indoor return air volume. For the first refrigeration system, when the indoor return air volume is increased, the heat exchange performance of the first evaporator is better, and under a same load demand, the first fluorine pump may be controlled to work at a higher outdoor temperature, and a natural cold source may be fully utilized, thereby reducing the energy consumption of the system and achieving the purpose of energy conservation. For the second refrigeration system, the return air volume passing through the second evaporator is ensured and the heat exchange capacity of the second evaporator is improved. By controlling an operation of the second compressor or the second fluorine pump, the first refrigeration system may be re-cooled or supplementarily cooled, and the energy consumption of the system can be reduced. Therefore, with the air conditioning unit, the high overall energy efficiency of the first refrigeration system and the second refrigeration system can be ensured. In addition, there is no question of whether supply air airflow with different temperatures is uniformly mixed in the air conditioning unit, so that a very uniform supply air temperature can be ensured, which is beneficial to more accurate control of the supply air temperature. In an embodiment, in a case of controlling the working state of the first compressor, the first fluorine pump, the second compressor and the second fluorine pump based on the load percentage and the difference between indoor and outdoor temperatures, the controller is specifically configured to:

in a case that the difference between indoor and outdoor temperatures is less than a first preset value, control the first compressor to work, the first fluorine pump not to work, the second compressor to work, and the second fluorine pump not to work, so that the air conditioning unit operates in a compressor mode for refrigeration, where the first preset value increases with increasing of the load percentage;

in a case that the difference between indoor and outdoor temperatures is greater than or equal to the first preset value and less than a second preset value, control the first compressor not to work, the first fluorine pump to work, the second compressor to work, and the second fluorine pump not to work, so that the air conditioning unit operates in a mixed mode for refrigeration, where the second preset value increases with increasing of the load percentage; and in a case that the difference between indoor and outdoor temperatures is greater than or equal to the second preset value, control the first compressor not to work, the first fluorine pump to work, the second compressor not to work, and the second fluorine pump to work, so that the air conditioning unit operates in a fluorine pump mode for refrigeration.

In an embodiment, after the air conditioning unit operates in the compressor mode for refrigeration, the controller is configured to:

acquire a refrigeration capacity in the compressor mode, an energy efficiency ratio in the compressor mode, an estimated refrigeration capacity in the mixed mode, and an estimated energy efficiency ratio in the mixed mode; and in a case that the refrigeration capacity in the compressor mode is less than or equal to the estimated refrigeration capacity in the mixed mode, and the energy efficiency ratio in the compressor mode is less than the estimated energy efficiency ratio in the mixed mode, control the air conditioning unit to operate in the mixed mode for refrigeration.

In an embodiment, after the air conditioning unit operates in the mixed mode for refrigeration, the controller is configured to:

acquire a refrigeration capacity in the mixed mode, an energy efficiency ratio in the mixed mode, an estimated refrigeration capacity in the compressor mode, an estimated energy efficiency ratio in the compressor mode, an estimated refrigeration capacity in the fluorine pump mode, and an estimated energy efficiency ratio in the fluorine pump mode;

in a case that the refrigeration capacity in the mixed mode is less than or equal to the estimated refrigeration capacity in the fluorine pump mode, and the energy efficiency ratio in the mixed mode is less than the estimated energy efficiency ratio in the fluorine pump mode, control the air conditioning unit to operate in the fluorine pump mode for refrigeration; and in a case that the refrigeration capacity in the mixed mode is less than or equal to the estimated refrigeration capacity in the compressor mode, and the energy efficiency ratio in the mixed mode is less than the estimated energy efficiency ratio in the compressor mode, control the air conditioning unit to operate in the compressor mode for refrigeration.

In an embodiment, after the air conditioning unit operates in the fluorine pump mode for refrigeration, the controller is configured to:

acquire a refrigeration capacity in the fluorine pump mode, an energy efficiency ratio in the fluorine pump mode, an estimated refrigeration capacity in the mixed mode and an estimated energy efficiency ratio in the mixed mode; and in a case that the refrigeration capacity in the fluorine pump mode is less than or equal to the estimated refrigeration capacity in the mixed mode, and the energy efficiency ratio in the fluorine pump mode is less than the estimated energy efficiency ratio in the mixed mode, control the air conditioning unit to operate in the mixed mode for refrigeration.

In an embodiment, the first evaporator and the second evaporator are two independent heat exchangers; or the first evaporator and the second evaporator are two heat exchangers with a common fin.

In an embodiment, the air conditioning unit is an integrated unit or a separated unit.

Based on the same inventive concept, an operation control method for an air conditioning unit is further provided according to the present disclosure, which is applied to any one of the air conditioning units provided in the above technical solutions. The operation control method includes:

acquiring a load percentage of the air conditioning unit and a difference between indoor and outdoor temperatures; and controlling a working state of the first compressor, the first fluorine pump, the second compressor and the second fluorine pump based on the load percentage and the difference between indoor and outdoor temperatures.

Based on the same inventive concept, an operation control device for an air conditioning unit is further provided according to the present disclosure, which includes an acquisition unit and a control unit.

The acquisition unit is configured to acquire a load percentage of the air conditioning unit and a difference between indoor and outdoor temperatures.

The control unit is configured to control a working state of the first compressor, the first fluorine pump, the second compressor and the second fluorine pump based on the load percentage and the difference between indoor and outdoor temperatures.

01—evaporator; 02—compressor; 03—condenser; 04—fluorine pump; 05—expansion valve; 06, 07—one—way valve; 11—first evaporator; 12—first compressor; 13—first condenser; 14—first fluorine pump; 15—first throttling element; 16—first one—way valve; 17—second one—way valve; 18—indoor air unit; 19—first outdoor air unit; 21—second evaporator; 22—second compressor; 23—second condenser; 24—second fluorine pump; 25—second throttling element; 26—third one—way valve; 27—fourth one—way valve; 28—second outdoor air unit.

DETAILED DESCRIPTION OF EMBODIMENTS

The technical solutions according to the embodiments of the present disclosure are described below clearly and completely in conjunction with the drawings in the embodiments of the present disclosure. Apparently, the embodiments described in the following are only some embodiments of the present disclosure, rather than all the embodiments. Any other embodiments obtained by those skilled in the art based on the embodiments of the present disclosure without any creative effort fall within the protection scope of the present disclosure.

Figure 1:
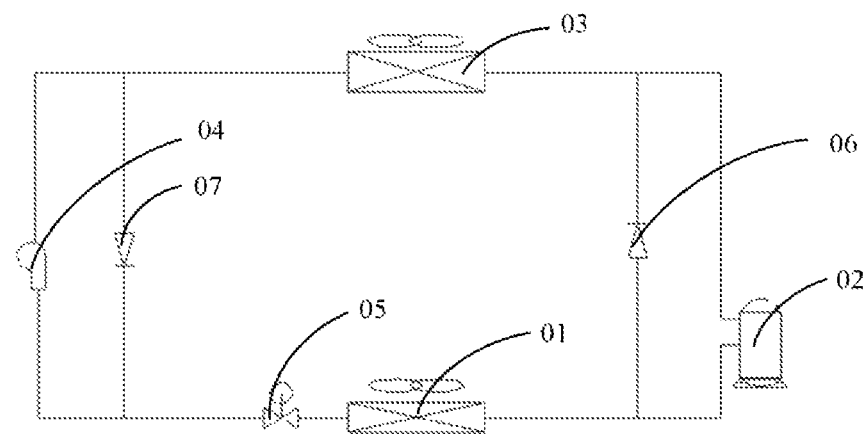
FIG. 1 is a schematic structural diagram of an air conditioning unit in the prior art.
Figure 2:
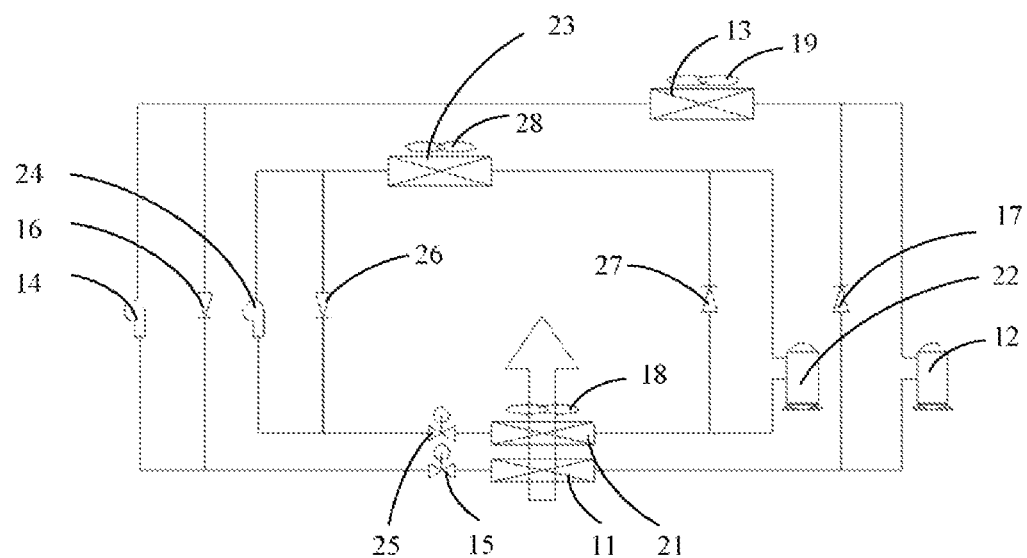
FIG. 2 is a schematic structural diagram of an air conditioning unit according to an embodiment of the present disclosure.

Referring to FIG. 2, an air conditioning unit is provided according to the present disclosure, which includes a first refrigeration system, a second refrigeration system, and a controller.

The first refrigeration system includes a first evaporator 11, a first compressor 12, a first condenser 13, a first one-way valve 16, and a first throttling element 15 connected in sequence in a loop as well as a second one-way valve 17 connected in parallel with the first compressor 12, and a first fluorine pump 14 connected in parallel with the first one-way valve 16.

The second refrigeration system includes a second evaporator 21, a second compressor 22, a second condenser 23, a third one-way valve 26, and a second throttling element 25 connected in sequence in a loop as well as a fourth one-way valve 27 connected in parallel with the second compressor 22, and a second fluorine pump 24 connected in parallel with the third one-way valve 26, where the first evaporator 11 and the second evaporator 21 are arranged front and rear in sequence along a return air cooling duct.

The controller is connected to the first compressor 12, the first fluorine pump 14, the second compressor 22 and the second fluorine pump 24 in signal, and configured to:

acquire a load percentage of the air conditioning unit and a difference between indoor and outdoor temperatures; and control a working state of the first compressor 12, the first fluorine pump 14, the second compressor 22 and the second fluorine pump 24 based on the load percentage and the difference between indoor and outdoor temperatures.

The air conditioning unit according to the embodiment of the present disclosure includes the first refrigeration system, the second refrigeration system, and the controller. The first refrigeration system and the second refrigeration system are independent of each other in a pipeline connection. Each refrigeration system is a complete refrigeration system integrated with the compressor and the fluorine pump. Since the first evaporator 11 in the first refrigeration system and the second evaporator 21 in the second refrigeration system are arranged front and rear in sequence along the return air cooling duct, when the air conditioning unit operates, in the return air cooling duct, an indoor return air may first pass through the first evaporator 11 for pre-cooling, and then pass through the second evaporator 21 for re-cooling or supplementary cooling, so as to achieve a supply air temperature required by a machine room where the air conditioning unit is located, or a cooling capacity required by the machine room. In the air conditioning unit, a return air volume passing through the first evaporator 11 and a return air volume passing through the second evaporator 21 are the same. A return air temperature of the first refrigeration system is equivalent to a return air temperature of the machine room, and a return air temperature of the second refrigeration system is equivalent to an outlet air temperature of the first refrigeration system. Compared with the air conditioning unit with completely independent dual refrigeration system, both the first refrigeration system and the second refrigeration system have a larger indoor return air volume. For the first refrigeration system, when the indoor return air volume is increased, the heat exchange performance of the first evaporator 11 is better, and under a same load demand, the first fluorine pump 14 may be controlled to work at a higher outdoor temperature, and a natural cold source may be fully utilized, thereby reducing the energy consumption of the system and achieving the purpose of energy conservation. For the second refrigeration system, the return air volume passing through the second evaporator 21 is ensured and the heat exchange capacity of the second evaporator 21 is improved. By controlling an operation of the second compressor 22 or the second fluorine pump 24, the first refrigeration system may be re-cooled or supplementarily cooled, and the energy consumption of the system can be reduced. Therefore, with the air conditioning unit, the high overall energy efficiency of the first refrigeration system and the second refrigeration system can be ensured. In addition, there is no question of whether supply air airflow with different temperatures is uniformly mixed in the air conditioning unit, so that a very uniform supply air temperature can be ensured, which is beneficial to more accurate control of the supply air temperature.

It should be noted that a first end of the return air cooling duct is connected to a return air vent of the machine room, and a second end is connected to a supply air vent of the machine room. The first evaporator 11 and the second evaporator 21 are arranged front and rear in sequence in the return air cooling duct. The load percentage may be a percentage of a currently required refrigeration capacity to a rated refrigeration capacity. The currently required refrigeration capacity is a heat load of the machine room. The currently required refrigeration capacity may be obtained from a cooling power of the machine room detected by machine room data detection equipment or a power required by the machine room, and sent by the machine room data detection equipment to the controller of the air conditioning unit. A first temperature sensor for measuring an indoor temperature and a second temperature sensor for measuring an outdoor temperature may also be provided in the air conditioning unit. The indoor temperature and the outdoor temperature are respectively detected by the first temperature sensor and the second temperature sensor. The difference between indoor and outdoor temperatures may be an absolute value of a difference between the indoor temperature and the outdoor temperature.

In the air conditioning unit according to the embodiment of the present disclosure, the first evaporator 11 and the second evaporator 21 may be two independent heat exchangers; alternatively, the first evaporator 11 and the second evaporator 21 are two heat exchangers with a common fin, that is, they look like one evaporator in appearance, so that a structure of the air conditioning unit may be more compact. Specifically, both the first evaporator 11 and the second evaporator 21 may be heat exchanging coilers in a "I" shape; alternatively, the first evaporator 11 and the second evaporator 21 may also jointly form two or more heat exchanging coilers in a "V" shape, which is not limited herein and depends on the actual situation, as long as the first evaporator 11 is located on a windward side and the second evaporator 21 is located on a leeward side along the return air cooling duct in a form of stacked coilers.

Specifically, the first compressor 12 and the second compressor 22 may be single variable frequency compressors, or may be larger variable capacity compressor assemblies composed of variable frequency compressors and one or more fixed frequency compressors. The first condenser 13 and the second condenser 23 may also be of various types of coilers, such as a heat exchanging coiler in a "I" shape, or a heat exchanging coiler in a "V" shape. Air paths where the first condenser 13 and the second condenser 23 are located are required to be independent of each other and not interfere with each other. The first throttling element 15 and the second throttling element 25 may be electronic expansion valves. The air conditioning unit may further include an indoor air unit 18 located in the return air cooling duct, a first outdoor air unit 19 corresponding to the first condenser 13, and a second outdoor air unit 28 corresponding to the second condenser 23, as shown in FIG. 2. The indoor air unit 18, the first outdoor air unit 19, the second outdoor air unit 28, the first fluorine pump 14, the second fluorine pump 24, the first compressor 12 and the second compressor 22 may all be controlled by frequency conversion, to achieve accurate control under each load.

Moreover, the first refrigeration system and the second refrigeration system are not limited to the structure shown in FIG. 2, and various modifications are possible. For example, a liquid reservoir is added between the fluorine pump and the condenser to ensure sufficient refrigerant inside the refrigeration system; a switch valve is added between the compressor and the evaporator, the throttling element is connected in parallel with a switch valve, or a maintenance valve is added at both ends of the compressor.

In an embodiment, the air conditioning unit may be in a form of an integrated unit, that is, all components in the air conditioning unit are integrated into one integrated unit. For example, the air conditioning unit may include an indoor unit part, an outdoor unit part, a compressor part, an energy conservation module part and the like. The indoor unit part may include the first evaporator 11, the second evaporator 21 and the like. The outdoor unit part may include the first condenser 13, the second condenser 23 and the like. The compressor part may include the first compressor 12, the second compressor 22 and the like. The energy conservation module part may include the first fluorine pump 14, the second fluorine pump 24 and the like. The first evaporator 11 and the second evaporator 21 of the air conditioning unit are located in the return air cooling duct. An inlet of the return air cooling duct is connected with a return air duct of the machine room, and an outlet of the return air cooling duct is connected with a supply air duct of the machine room.

In an embodiment, the air conditioning unit may also be in a form of a separated unit. For example, the air conditioning unit may include an indoor unit and an outdoor unit, and a compressor part and an energy conservation module part may be arranged inside the indoor unit and the outdoor unit, respectively, or may be used as independent modules.

In the air conditioning unit according to the embodiment of the present disclosure, each of the first refrigeration system and the second refrigeration system is a complete refrigeration system integrated with the compressor and the fluorine pump. The controller may control the air conditioning unit to operate in different working modes for refrigeration by controlling the first compressor 12, the first fluorine pump 14, the second compressor 22 and the second fluorine pump 24 in different states. For example, when the first compressor 12 is working, the first fluorine pump 14 is not working, the second compressor 22 is working, and the second fluorine pump 24 is not working, the air conditioning unit operates in a compressor mode. When the first compressor 12 is not working, the first fluorine pump 14 is working, the second compressor 22 is working, and the second fluorine pump 24 is not working, the air conditioning unit operates in a mixed mode. When the first compressor 12 is not working, the first fluorine pump 14 is working, the second compressor 22 is not working, and the second fluorine pump 24 is working, the air conditioning unit operates in a fluorine pump mode.

In an embodiment, in a case of controlling the working state of the first compressor 12, the first fluorine pump 14, the second compressor 22 and the second fluorine pump 24 based on the load percentage and the difference between indoor and outdoor temperatures, the controller may be specifically configured to:

in a case that the difference between indoor and outdoor temperatures is less than a first preset value, control the first compressor 12 to work, the first fluorine pump 14 not to work, the second compressor 22 to work, and the second fluorine pump 24 not to work, so that the air conditioning unit operates in a compressor mode for refrigeration, where the first preset value increases with increasing of the load percentage;

in a case that the difference between indoor and outdoor temperatures is greater than or equal to the first preset value and less than a second preset value, control the first compressor 12 not to work, the first fluorine pump 14 to work, the second compressor 22 to work, and the second fluorine pump 24 not to work, so that the air conditioning unit operates in a mixed mode for refrigeration, where the second preset value increases with increasing of the load percentage; and in a case that the difference between indoor and outdoor temperatures is greater than or equal to the second preset value, control the first compressor 12 not to work, the first fluorine pump 14 to work, the second compressor 22 not to work, and the second fluorine pump 24 to work, so that the air conditioning unit operates in a fluorine pump mode for refrigeration.

In the embodiment, in a process of starting the air conditioning unit, in the case that the difference between indoor and outdoor temperatures is less than the first preset value, the air conditioning unit is controlled to operate in the compressor mode for refrigeration. In the case that the difference between indoor and outdoor temperatures is greater than or equal to the first preset value and less than the second preset value, the air conditioning unit is controlled to operate in the mixed mode for refrigeration. In the case that the difference between indoor and outdoor temperatures is greater than or equal to the second preset value, the air conditioning unit is controlled to operate in the fluorine pump mode for refrigeration. The air conditioning unit may be intelligently controlled to operate in different working modes for refrigeration based on the difference between indoor and outdoor temperatures, which can effectively save the energy and improve the energy efficiency of the system of the air conditioning unit. Moreover, both the first preset value and the second preset value increase with increasing of the load percentage. The disadvantage of using a single temperature point is avoided, the working mode in which the air conditioning unit is required to operate may be more intelligently judged based on the indoor and outdoor temperatures and the load percentage, and the energy efficiency of the system of the air conditioning unit is improved.

Figure 3:
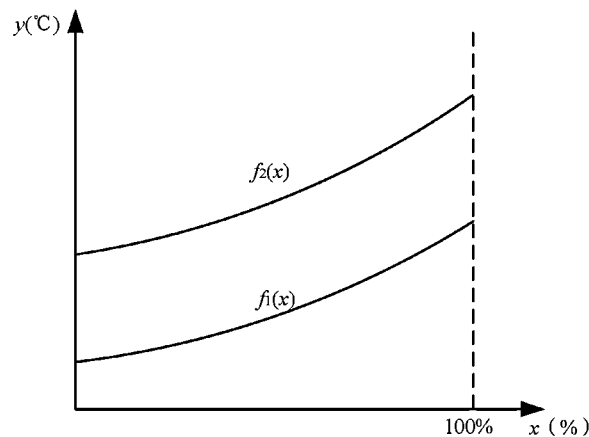
FIG. 3 is a graph of changes of a first preset value and a second preset value according to an embodiment of the present disclosure.

FIG. 3 is a schematic graph of changes in which a first preset value and a second preset value change with a load percentage, where x represents a load percentage, $f_1(x)$ represents a curve of a change of a first preset value, and $f_2(x)$ represents a curve of a change of a second preset value. Specifically, a function of the curve of the change of the first preset value and the second preset value is not limited herein, and may be set based on parameter data obtained by a designer through an experiment.

In the air conditioning unit according to the embodiment of the present disclosure, in a process of operating the air conditioning unit, as the outdoor temperature changes, the air conditioning unit may control the switching between various working modes for refrigeration by effectively utilizing the natural cold source, which can save the energy, and ensure the energy efficiency of the system of the air conditioning unit. For the same refrigeration demand and in the same working mode, when the outdoor temperature is high, the air conditioning unit may utilize fewer natural cold sources, and the energy efficiency of the system is relatively low. When the outdoor temperature is low, the air conditioning unit may utilize more natural cold sources, and the energy efficiency of the system is relatively high. Moreover, for the same refrigeration demand, if it may operate in multiple working modes, the pump mode has the highest energy efficiency, and the compressor mode has the lowest energy efficiency.

Figure 4:
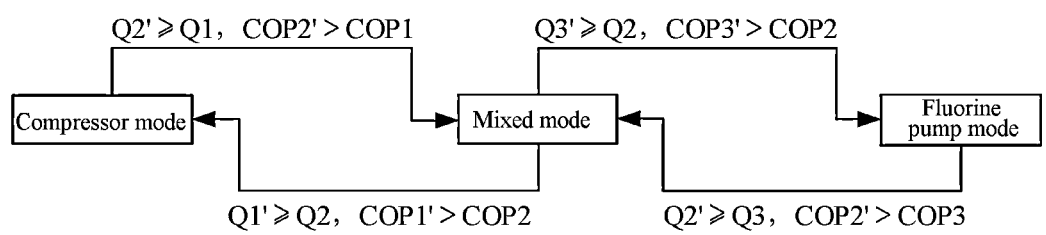
FIG. 4 is a state transition diagram between different refrigeration modes according to an embodiment of the present disclosure.

In the embodiment of the present disclosure, specifically, as shown in FIG. 4, in a process of switching working modes of the air conditioning unit, the outdoor temperature decreases from left to right, and the outdoor temperature increases from right to left. The controller of the air conditioning unit may control the switching of working modes based on a refrigeration capacity and an energy efficiency ratio of the system.

In an embodiment, as shown in FIG. 4, after the air conditioning unit operates in the compressor mode for refrigeration, the controller may be specifically configured to: acquire a refrigeration capacity in the compressor mode Q1, an energy efficiency ratio in the compressor mode COP1, an estimated refrigeration capacity in the mixed mode Q2', and an estimated energy efficiency ratio in the mixed mode COPT; and in a case that the refrigeration capacity in the compressor mode Q1 is less than or equal to the estimated refrigeration capacity in the mixed mode Q2', and the energy efficiency ratio in the compressor mode COP1 is less than the estimated energy efficiency ratio in the mixed mode COPT, control the air conditioning unit to operate in the mixed mode for refrigeration.

In the embodiment, when the air conditioning unit operates in the compressor mode for refrigeration, as the outdoor temperature decreases, natural cold sources available for the air conditioning unit increase. In a case that the refrigeration capacity in the compressor mode Q1 is less than or equal to the estimated refrigeration capacity in the mixed mode Q2', and the energy efficiency ratio in the compressor mode COP1 is less than the estimated energy efficiency ratio in the mixed mode COPT, the working mode of the air conditioning unit may be controlled to be switched from the compressor mode to the mixed mode, and the first fluorine pump 14 in the first refrigeration system works and the second compressor 22 in the second refrigeration system works. The natural cold source may be effectively utilized, thereby improving the energy efficiency of the system. The refrigeration capacity in the compressor mode Q1 is a refrigeration capacity of the air conditioning unit in the current working mode. The energy efficiency ratio in the compressor mode COP1 is an energy efficiency ratio of the system of the air conditioning unit in the current working mode. The estimated refrigeration capacity in the mixed mode Q2' is a refrigeration capacity of the air conditioning unit if operating in the mixed mode under the current outdoor temperature, which is calculated based on a calculation parameter obtained by the controller. The estimated energy efficiency ratio in the mixed mode COPT is an energy efficiency ratio of the system of the air conditioning unit if operating in the mixed mode under the current outdoor temperature, which is calculated based on a calculation parameter obtained by the controller. The calculation parameters of the estimated refrigeration capacity in the mixed mode Q2' and the estimated energy efficiency ratio in the mixed mode COPT are not described in detail herein, and may be calculated based on calculation formulas known in the art. The energy efficiency ratio of the system is a ratio of the refrigeration capacity of the air conditioning unit to the electric energy consumption.

In an embodiment, as shown in FIG. 4, after the air conditioning unit operates in the mixed mode for refrigeration, the controller may be specifically configured to: acquire a refrigeration capacity in the mixed mode Q2, an energy efficiency ratio in the mixed mode COP2, an estimated refrigeration capacity in the compressor mode Q1', an estimated energy efficiency ratio in the compressor mode COP1', an estimated refrigeration capacity in the fluorine pump mode Q3', and an estimated energy efficiency ratio in the fluorine pump mode COP3'; in a case that the refrigeration capacity in the mixed mode Q2 is less than or equal to the estimated refrigeration capacity in the fluorine pump mode Q3', and the energy efficiency ratio in the mixed mode COP2 is less than the estimated energy efficiency ratio in the fluorine pump mode COP3', control the air conditioning unit to operate in the fluorine pump mode for refrigeration; and in a case that the refrigeration capacity in the mixed mode Q2 is less than or equal to the estimated refrigeration capacity in the compressor mode Q1', and the energy efficiency ratio in the mixed mode COP2 is less than the estimated energy efficiency ratio in the compressor mode, control the air conditioning unit to operate in the compressor mode for refrigeration.

In the embodiment, when the air conditioning unit operates in the mixed mode for refrigeration, as the outdoor temperature decreases, natural cold sources available for the air conditioning unit increase. In a case that the refrigeration capacity in the mixed mode Q2 is less than or equal to the estimated refrigeration capacity in the fluorine pump mode Q3', and the energy efficiency ratio in the mixed mode COP2 is less than the estimated energy efficiency ratio in the fluorine pump mode COP3', the working mode of the air conditioning unit may be controlled to be switched from the mixed mode to the fluorine pump mode. Both the first fluorine pump 14 of the first refrigeration system and the second fluorine pump 24 of the second refrigeration system work. The natural cold source may be effectively utilized, thereby improving the energy efficiency of the system. The refrigeration capacity in the mixed mode Q2 is a refrigeration capacity of the air conditioning unit in the current working mode. The energy efficiency ratio in the mixed mode COP2 is an energy efficiency ratio of the system of the air conditioning unit in the current working mode. The estimated refrigeration capacity in the fluorine pump mode Q3' is a refrigeration capacity of the air conditioning unit if operating in the fluorine pump mode under the current outdoor temperature, which is calculated based on a calculation parameter obtained by the controller. The estimated energy efficiency ratio in the fluorine pump mode COP3' is an energy efficiency ratio of the system of the air conditioning unit if operating in the fluorine pump mode under the current outdoor temperature, which is calculated based on a calculation parameter obtained by the controller. The calculation parameters of the estimated refrigeration capacity in the fluorine pump mode Q3' and the estimated energy efficiency ratio in the fluorine pump mode COPS' are not described in detail herein, and may be calculated based on calculation formulas known in the art.

In the embodiment, when the air conditioning unit operates in the mixed mode for refrigeration, as the outdoor temperature increases, natural cold sources available for the air conditioning unit decrease. In a case that the refrigeration capacity in the mixed mode Q2 is less than or equal to the estimated refrigeration capacity in the compressor mode Q1', and the energy efficiency ratio in the mixed mode COP2 is less than the estimated energy efficiency ratio in the compressor mode COP1', the working mode of the air conditioning unit may be controlled to be switched from the mixed mode to the compressor mode. Both the first compressor 12 of the first refrigeration system and the second compressor 22 of the second refrigeration system work, thereby improving the energy efficiency of the system. The refrigeration capacity in the mixed mode Q2 is a refrigeration capacity of the air conditioning unit in the current working mode. The energy efficiency ratio in the mixed mode COP2 is an energy efficiency ratio of the system of the air conditioning unit in the current working mode. The estimated refrigeration capacity in the compressor mode Q1' is a refrigeration capacity of the air conditioning unit if operating in the compressor mode under the current outdoor temperature, which is calculated based on a calculation parameter obtained by the controller. The estimated energy efficiency ratio in the compressor mode COP1' is an energy efficiency ratio of the system of the air conditioning unit if operating in the compressor mode under the current outdoor temperature, which is calculated based on a calculation parameter obtained by the controller. The calculation parameters of the estimated refrigeration capacity in the compressor mode Q1' and the estimated energy efficiency ratio in the compressor mode COP1' are not described in detail herein, and may be calculated based on calculation formulas known in the art.

In an embodiment, as shown in FIG. 4, after the air conditioning unit operates in the fluorine pump mode for refrigeration, the controller is configured to: acquire a refrigeration capacity in the fluorine pump mode Q3, an energy efficiency ratio in the fluorine pump mode COP3, an estimated refrigeration capacity in the mixed mode Q2' and an estimated energy efficiency ratio in the mixed mode COP2'; and in a case that the refrigeration capacity in the fluorine pump mode Q3 is less than or equal to the estimated refrigeration capacity in the mixed mode Q2', and the energy efficiency ratio in the fluorine pump mode COP3 is less than the estimated energy efficiency ratio in the mixed mode COP2', control the air conditioning unit to operate in the mixed mode for refrigeration.

In the embodiment, when the air conditioning unit operates in the fluorine pump mode for refrigeration, as the outdoor temperature increases, natural cold sources available for the air conditioning unit decrease. In a case that the refrigeration capacity in the fluorine pump mode Q3 is less than or equal to the estimated refrigeration capacity in the mixed mode Q2', and the energy efficiency ratio in the fluorine pump mode COP3 is less than the estimated energy efficiency ratio in the mixed mode COP2', the working mode of the air conditioning unit may be controlled to be switched from the fluorine pump mode to the mixed mode. The first fluorine pump 14 of the first refrigeration system and the second compressor 22 of the second refrigeration system work, thereby improving the energy efficiency of the system. The refrigeration capacity in the fluorine pump mode Q3 is a refrigeration capacity of the air conditioning unit in the current working mode. The energy efficiency ratio in the fluorine pump mode COP3 is an energy efficiency ratio of the system of the air conditioning unit in the current working mode. The estimated refrigeration capacity in the mixed mode Q2' is a refrigeration capacity of the air conditioning unit if operating in the mixed mode under the current outdoor temperature, which is calculated based on a calculation parameter obtained by the controller. The estimated energy efficiency ratio in the mixed mode COP2' is an energy efficiency ratio of the system of the air conditioning unit if operating in the mixed mode under the current outdoor temperature, which is calculated based on a calculation parameter obtained by the controller. The calculation parameters of the estimated refrigeration capacity in the mixed mode Q2' and the estimated energy efficiency ratio in the mixed mode COP2' are not described in detail herein, and may be calculated based on calculation formulas known in the art.

In the air conditioning unit according to the embodiments of the present disclosure, whether to switch the working mode of the air conditioning unit is judged by using the refrigeration capacity and the energy efficiency ratio of the system, which can avoid the disadvantage of using a single outdoor temperature point to switch. In the part-load interval, the natural cold source may be used at a higher outdoor temperature, that is, the mixed mode or the fluorine pump mode may be operated at the higher outdoor temperature, which further improves the energy efficiency of the system of the air conditioning unit in the part-load interval.

Figure 5:
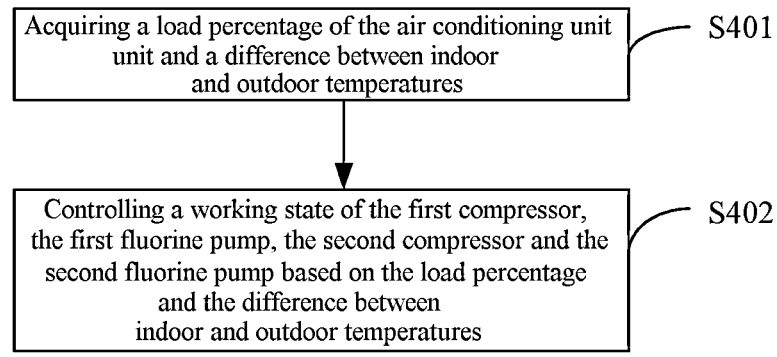
FIG. 5 is a schematic flowchart of an operation control method for an air conditioning unit according to an embodiment of the present disclosure.

Based on the same inventive concept, an operation control method for an air conditioning unit is further provided according to the present disclosure, which is applied to any one of the air conditioning units provided in the above technical solutions. The operation control method, as shown in FIG. 5, includes the following steps S401 to S402.

In S401, a load percentage of the air conditioning unit and a difference between indoor and outdoor temperatures are acquired.

In S402, a working state of the first compressor, the first fluorine pump, the second compressor and the second fluorine pump is controlled based on the load percentage and the difference between indoor and outdoor temperatures.

In the operation control method for the air conditioning unit, since the first evaporator in the first refrigeration system and the second evaporator in the second refrigeration system are arranged front and rear in sequence along the return air cooling duct, when the air conditioning unit operates, in the return air cooling duct, an indoor return air may first pass through the first evaporator for pre-cooling, and then pass through the second evaporator for re-cooling or supplementary cooling, so as to achieve a supply air temperature required by a machine room where the air conditioning unit is located, or a cooling capacity required by the machine room. The working state of the first compressor, the first fluorine pump, the second compressor and the second fluorine pump is controlled based on the load percentage and the difference between indoor and outdoor temperatures. The first fluorine pump may be controlled to work utilizing the natural cold source at the higher outdoor temperature, and the second compressor or the second fluorine pump may be controlled to work, to re-cool or supplementarily cool the first refrigeration system, thereby reducing the energy consumption of the system and improving the energy efficiency of the system of the air conditioning unit.

In an embodiment, in a case of controlling the working state of the first compressor, the first fluorine pump, the second compressor and the second fluorine pump based on the load percentage and the difference between indoor and outdoor temperatures, the method includes the following operations:

in a case that the difference between indoor and outdoor temperatures is less than a first preset value, controlling the first compressor to work, the first fluorine pump not to work, the second compressor to work, and the second fluorine pump not to work, so that the air conditioning unit operates in a compressor mode for refrigeration, where the first preset value increases with increasing of the load percentage;

in a case that the difference between indoor and outdoor temperatures is greater than or equal to the first preset value and less than a second preset value, controlling the first compressor not to work, the first fluorine pump to work, the second compressor to work, and the second fluorine pump not to work, so that the air conditioning unit operates in a mixed mode for refrigeration, where the second preset value increases with increasing of the load percentage; and in a case that the difference between indoor and outdoor temperatures is greater than or equal to the second preset value, controlling the first compressor not to work, the first fluorine pump to work, the second compressor not to work, and the second fluorine pump to work, so that the air conditioning unit operates in a fluorine pump mode for refrigeration.

In an embodiment, after the air conditioning unit operates in the compressor mode for refrigeration, the method includes the following operations:

acquiring a refrigeration capacity in the compressor mode, an energy efficiency ratio in the compressor mode, an estimated refrigeration capacity in the mixed mode, and an estimated energy efficiency ratio in the mixed mode; and in a case that the refrigeration capacity in the compressor mode is less than or equal to the estimated refrigeration capacity in the mixed mode, and the energy efficiency ratio in the compressor mode is less than the estimated energy efficiency ratio in the mixed mode, controlling the air conditioning unit to operate in the mixed mode for refrigeration.

In an embodiment, after the air conditioning unit operates in the mixed mode for refrigeration, the method includes the following operations:

acquiring a refrigeration capacity in the mixed mode, an energy efficiency ratio in the mixed mode, an estimated refrigeration capacity in the compressor mode, an estimated energy efficiency ratio in the compressor mode, an estimated refrigeration capacity in the fluorine pump mode, and an estimated energy efficiency ratio in the fluorine pump mode;

in a case that the refrigeration capacity in the mixed mode is less than or equal to the estimated refrigeration capacity in the fluorine pump mode, and the energy efficiency ratio in the mixed mode is less than the estimated energy efficiency ratio in the fluorine pump mode, controlling the air conditioning unit to operate in the fluorine pump mode for refrigeration; and in a case that the refrigeration capacity in the mixed mode is less than or equal to the estimated refrigeration capacity in the compressor mode, and the energy efficiency ratio in the mixed mode is less than the estimated energy efficiency ratio in the compressor mode, controlling the air conditioning unit to operate in the compressor mode for refrigeration.

In an embodiment, after the air conditioning unit operates in the fluorine pump mode, the method includes the following operations:

acquiring a refrigeration capacity in the fluorine pump mode, an energy efficiency ratio in the fluorine pump mode, an estimated refrigeration capacity in the mixed mode and an estimated energy efficiency ratio in the mixed mode; and in a case that the refrigeration capacity in the fluorine pump mode is less than or equal to the estimated refrigeration capacity in the mixed mode, and the energy efficiency ratio in the fluorine pump mode is less than the estimated energy efficiency ratio in the mixed mode, controlling the air conditioning unit to operate in the mixed mode for refrigeration.

Figure 6:
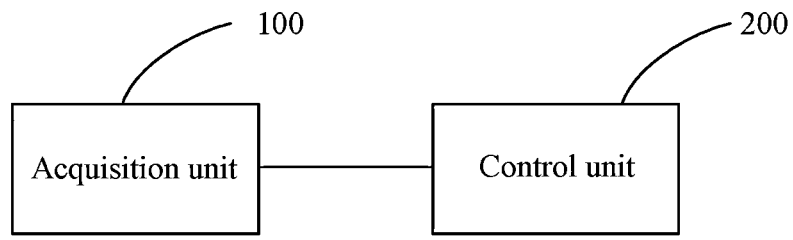
FIG. 6 is a schematic structural diagram of an operation control device for an air conditioning unit according to an embodiment of the present disclosure.

Based on the same inventive concept, an operation control device for an air conditioning unit is further provided according to the present disclosure, which, as shown in FIG. 6, includes an acquisition unit 100 and a control unit 200.

The acquisition unit 100 is configured to acquire a load percentage of the air conditioning unit and a difference between indoor and outdoor temperatures.

The control unit 200 is configured to control a working state of the first compressor, the first fluorine pump, the second compressor and the second fluorine pump based on the load percentage and the difference between indoor and outdoor temperatures.

In the operation control device for the air conditioning unit, since the first evaporator in the first refrigeration system and the second evaporator in the second refrigeration system are arranged front and rear in sequence along the return air cooling duct, when the air conditioning unit operates, in the return air cooling duct, an indoor return air may first pass through the first evaporator for pre-cooling, and then pass through the second evaporator for re-cooling or supplementary cooling, so as to achieve a supply air temperature required by a machine room where the air conditioning unit is located, or a cooling capacity required by the machine room. The working state of the first compressor, the first fluorine pump, the second compressor and the second fluorine pump is controlled based on the load percentage and the difference between indoor and outdoor temperatures. The first fluorine pump may be controlled to work utilizing the natural cold source at the higher outdoor temperature, and the second compressor or the second fluorine pump may be controlled to work, to re-cool or supplementarily cool the first refrigeration system, thereby reducing the energy consumption of the system and improving the energy efficiency of the system of the air conditioning unit.

In an embodiment, in a case of controlling the working state of the first compressor, the first fluorine pump, the second compressor and the second fluorine pump based on the load percentage and the difference between indoor and outdoor temperatures, the control unit 200 is specifically configured to:

in a case that the difference between indoor and outdoor temperatures is less than a first preset value, control the first compressor to work, the first fluorine pump not to work, the second compressor to work, and the second fluorine pump not to work, so that the air conditioning unit operates in a compressor mode for refrigeration, where the first preset value increases with increasing of the load percentage;

in a case that the difference between indoor and outdoor temperatures is greater than or equal to the first preset value and less than a second preset value, control the first compressor not to work, the first fluorine pump to work, the second compressor to work, and the second fluorine pump not to work, so that the air conditioning unit operates in a mixed mode for refrigeration, where the second preset value increases with increasing of the load percentage; and in a case that the difference between indoor and outdoor temperatures is greater than or equal to the second preset value, control the first compressor not to work, the first fluorine pump to work, the second compressor not to work, and the second fluorine pump to work, so that the air conditioning unit operates in a fluorine pump mode for refrigeration.

In an embodiment, after the air conditioning unit operates in the compressor mode for refrigeration, the acquisition unit 100 is specifically configured to:

acquire a refrigeration capacity in the compressor mode, an energy efficiency ratio in the compressor mode, an estimated refrigeration capacity in the mixed mode, and an estimated energy efficiency ratio in the mixed mode; and the control unit 200 is specifically configured to:

in a case that the refrigeration capacity in the compressor mode is less than or equal to the estimated refrigeration capacity in the mixed mode, and the energy efficiency ratio in the compressor mode is less than the estimated energy efficiency ratio in the mixed mode, control the air conditioning unit to operate in the mixed mode for refrigeration.

In an embodiment, after the air conditioning unit operates in the mixed mode for refrigeration, the acquisition unit 100 is specifically configured to:

acquire a refrigeration capacity in the mixed mode, an energy efficiency ratio in the mixed mode, an estimated refrigeration capacity in the compressor mode, an estimated energy efficiency ratio in the compressor mode, an estimated refrigeration capacity in the fluorine pump mode, and an estimated energy efficiency ratio in the fluorine pump mode; and the control unit 200 is specifically configured to:

in a case that the refrigeration capacity in the mixed mode is less than or equal to the estimated refrigeration capacity in the fluorine pump mode, and the energy efficiency ratio in the mixed mode is less than the estimated energy efficiency ratio in the fluorine pump mode, control the air conditioning unit to operate in the fluorine pump mode for refrigeration; and in a case that the refrigeration capacity in the mixed mode is less than or equal to the estimated refrigeration capacity in the compressor mode, and the energy efficiency ratio in the mixed mode is less than the estimated energy efficiency ratio in the compressor mode, control the air conditioning unit to operate in the compressor mode for refrigeration.

In an embodiment, after the air conditioning unit operates in the fluorine pump mode, the acquisition unit 100 is specifically configured to:

acquire a refrigeration capacity in the fluorine pump mode, an energy efficiency ratio in the fluorine pump mode, an estimated refrigeration capacity in the mixed mode and an estimated energy efficiency ratio in the mixed mode; and the control unit 200 is specifically configured to:

in a case that the refrigeration capacity in the fluorine pump mode is less than or equal to the estimated refrigeration capacity in the mixed mode, and the energy efficiency ratio in the fluorine pump mode is less than the estimated energy efficiency ratio in the mixed mode, control the air conditioning unit to operate in the mixed mode for refrigeration.

It is apparent that, those skilled in the art may make various changes and variations to the embodiments of the present disclosure without departing from the spirit and scope of the present disclosure. In this case, if the changes and variations of the present disclosure fall within the scope of the claims of the present disclosure and equivalent technologies thereof, the present disclosure is intended to include the changes and variations.

The invention claimed is:

1. An air conditioning unit, comprising:
   a first refrigeration system comprising a first evaporator, a first compressor, a first condenser, a first one-way valve, and a first throttling element connected in sequence in a loop as well as a second one-way valve connected in parallel with the first compressor, and a first fluorine pump connected in parallel with the first one-way valve;
   a second refrigeration system comprising a second evaporator, a second compressor, a second condenser, a third one-way valve, and a second throttling element connected in sequence in a loop as well as a fourth one-way valve connected in parallel with the second compressor, and a second fluorine pump connected in parallel with the third one-way valve, wherein the first evaporator is upstream from the second evaporator in an airflow direction in a return air cooling duct; and
   a controller communicatively connected to the first compressor, the first fluorine pump, the second compressor and the second fluorine pump, and configured to:
   acquire a load percentage of the air conditioning unit and a difference between indoor and outdoor temperatures; and
      control a working state of the first compressor, the first fluorine pump, the second compressor and the second fluorine pump based on the load percentage and the difference between indoor and outdoor temperatures,
      wherein the controlling comprises controlling the working state of the first compressor, the first fluorine pump, the second compressor and the second fluorine pump by comparing the difference between indoor and outdoor temperatures with a first preset value and a second preset value greater than the first preset value, and
      wherein the first preset value and the second preset value increase with increasing of the load percentage.

2. The air conditioning unit according to claim 1, wherein in a case of controlling the working state of the first compressor, the first fluorine pump, the second compressor and the second fluorine pump based on the load percentage and the difference between indoor and outdoor temperatures, the controller is specifically configured to:
   in a case that the difference between indoor and outdoor temperatures is less than a first preset value, control the first compressor to work, the first fluorine pump not to work, the second compressor to work, and the second fluorine pump not to work, so that the air conditioning unit operates in a compressor mode for refrigeration;
   in a case that the difference between indoor and outdoor temperatures is greater than or equal to the first preset value and less than a second preset value, control the first compressor not to work, the first fluorine pump to work, the second compressor to work, and the second fluorine pump not to work, so that the air conditioning unit operates in a mixed mode for refrigeration; and
   in a case that the difference between indoor and outdoor temperatures is greater than or equal to the second preset value, control the first compressor not to work, the first fluorine pump to work, the second compressor not to work, and the second fluorine pump to work, so that the air conditioning unit operates in a fluorine pump mode for refrigeration.

3. The air conditioning unit according to claim 2, wherein after the air conditioning unit operates in the compressor mode for refrigeration, the controller is configured to:
   acquire a refrigeration capacity in the compressor mode, an energy efficiency ratio in the compressor mode, an estimated refrigeration capacity in the mixed mode, and an estimated energy efficiency ratio in the mixed mode; and
   in a case that the refrigeration capacity in the compressor mode is less than or equal to the estimated refrigeration capacity in the mixed mode, and the energy efficiency ratio in the compressor mode is less than the estimated energy efficiency ratio in the mixed mode, control the air conditioning unit to operate in the mixed mode for refrigeration.

4. The air conditioning unit according to claim 2, wherein after the air conditioning unit operates in the mixed mode for refrigeration, the controller is configured to:
   acquire a refrigeration capacity in the mixed mode, an energy efficiency ratio in the mixed mode, an estimated refrigeration capacity in the compressor mode, an estimated energy efficiency ratio in the compressor mode, an estimated refrigeration capacity in the fluorine pump mode, and an estimated energy efficiency ratio in the fluorine pump mode;
   in a case that the refrigeration capacity in the mixed mode is less than or equal to the estimated refrigeration capacity in the fluorine pump mode, and the energy efficiency ratio in the mixed mode is less than the estimated energy efficiency ratio in the fluorine pump mode, control the air conditioning unit to operate in the fluorine pump mode for refrigeration; and
   in a case that the refrigeration capacity in the mixed mode is less than or equal to the estimated refrigeration capacity in the compressor mode, and the energy efficiency ratio in the mixed mode is less than the estimated energy efficiency ratio in the compressor mode, control the air conditioning unit to operate in the compressor mode for refrigeration.

5. The air conditioning unit according to claim 2, wherein after the air conditioning unit operates in the fluorine pump mode for refrigeration, the controller is configured to:
   acquire a refrigeration capacity in the fluorine pump mode, an energy efficiency ratio in the fluorine pump mode, an estimated refrigeration capacity in the mixed mode and an estimated energy efficiency ratio in the mixed mode; and
   in a case that the refrigeration capacity in the fluorine pump mode is less than or equal to the estimated refrigeration capacity in the mixed mode, and the energy efficiency ratio in the fluorine pump mode is less than the estimated energy efficiency ratio in the mixed mode, control the air conditioning unit to operate in the mixed mode for refrigeration.

6. The air conditioning unit according to claim 1, wherein the first evaporator and the second evaporator are two independent heat exchangers; or
   the first evaporator and the second evaporator are two heat exchangers with a common fin.

7. The air conditioning unit according to claim 1, wherein the air conditioning unit is an integrated unit or a separated unit.

8. An operation control method for an air conditioning unit, applied to the air conditioning unit according to claim 1, comprising:
  acquiring a load percentage of the air conditioning unit and a difference between indoor and outdoor temperatures; and
  controlling a working state of the first compressor, the first fluorine pump, the second compressor and the second fluorine pump based on the load percentage and the difference between indoor and outdoor temperatures.

9. The operation control method according to claim 8, wherein in a case of controlling the working state of the first compressor, the first fluorine pump, the second compressor and the second fluorine pump based on the load percentage and the difference between indoor and outdoor temperatures, the method comprises:
  in a case that the difference between indoor and outdoor temperatures is less than a first preset value, controlling the first compressor to work, the first fluorine pump not to work, the second compressor to work, and the second fluorine pump not to work, so that the air conditioning unit operates in a compressor mode for refrigeration;
  in a case that the difference between indoor and outdoor temperatures is greater than or equal to the first preset value and less than a second preset value, controlling the first compressor not to work, the first fluorine pump to work, the second compressor to work, and the second fluorine pump not to work, so that the air conditioning unit operates in a mixed mode for refrigeration; and
  in a case that the difference between indoor and outdoor temperatures is greater than or equal to the second preset value, controlling the first compressor not to work, the first fluorine pump to work, the second compressor not to work, and the second fluorine pump to work, so that the air conditioning unit operates in a fluorine pump mode for refrigeration.

10. The operation control method according to claim 9, wherein after the air conditioning unit operates in the compressor mode for refrigeration, the method comprises:
  acquiring a refrigeration capacity in the compressor mode, an energy efficiency ratio in the compressor mode, an estimated refrigeration capacity in the mixed mode, and an estimated energy efficiency ratio in the mixed mode; and
  in a case that the refrigeration capacity in the compressor mode is less than or equal to the estimated refrigeration capacity in the mixed mode, and the energy efficiency ratio in the compressor mode is less than the estimated energy efficiency ratio in the mixed mode, controlling the air conditioning unit to operate in the mixed mode for refrigeration.

11. The operation control method according to claim 9, wherein after the air conditioning unit operates in the mixed mode for refrigeration, the method comprises:
  acquiring a refrigeration capacity in the mixed mode, an energy efficiency ratio in the mixed mode, an estimated refrigeration capacity in the compressor mode, an estimated energy efficiency ratio in the compressor mode, an estimated refrigeration capacity in the fluorine pump mode, and an estimated energy efficiency ratio in the fluorine pump mode;
  in a case that the refrigeration capacity in the mixed mode is less than or equal to the estimated refrigeration capacity in the fluorine pump mode, and the energy efficiency ratio in the mixed mode is less than the estimated energy efficiency ratio in the fluorine pump mode, controlling the air conditioning unit to operate in the fluorine pump mode for refrigeration; and
  in a case that the refrigeration capacity in the mixed mode is less than or equal to the estimated refrigeration capacity in the compressor mode, and the energy efficiency ratio in the mixed mode is less than the estimated energy efficiency ratio in the compressor mode, controlling the air conditioning unit to operate in the compressor mode for refrigeration.

12. The operation control method according to claim 9, wherein after the air conditioning unit operates in the fluorine pump mode for refrigeration, the method comprises:
  acquiring a refrigeration capacity in the fluorine pump mode, an energy efficiency ratio in the fluorine pump mode, an estimated refrigeration capacity in the mixed mode and an estimated energy efficiency ratio in the mixed mode; and
  in a case that the refrigeration capacity in the fluorine pump mode is less than or equal to the estimated refrigeration capacity in the mixed mode, and the energy efficiency ratio in the fluorine pump mode is less than the estimated energy efficiency ratio in the mixed mode, controlling the air conditioning unit to operate in the mixed mode for refrigeration.

13. An operation control device for an air conditioning unit, using the operation control method according to claim 8.

* * * * *